E. J. MARKEL.
CONTROLLING MECHANISM.
APPLICATION FILED OCT. 21, 1912.
1,061,765.
Patented May 13, 1913.
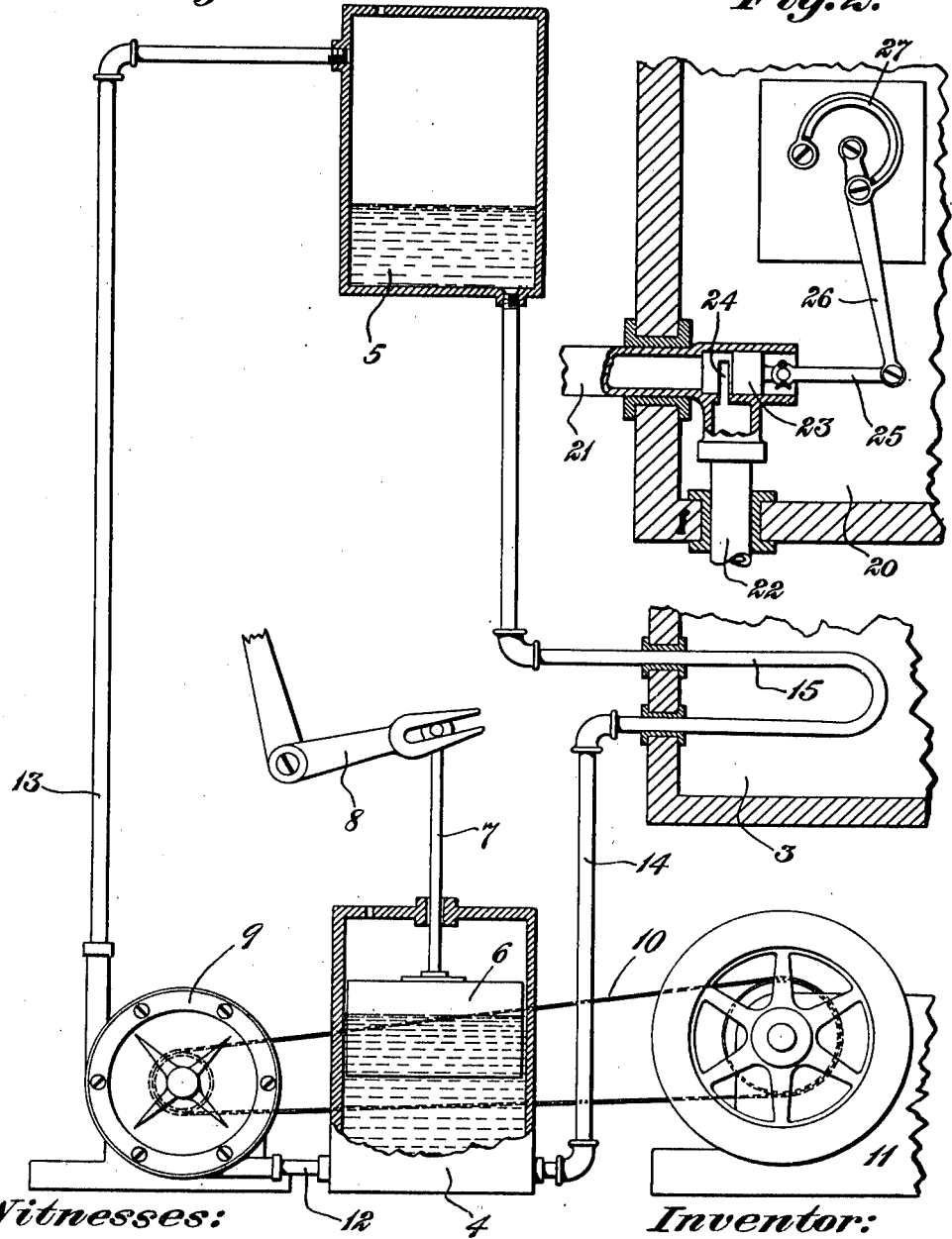

UNITED STATES PATENT OFFICE.

EMERICH J. MARKEL, OF NEW HAVEN, CONNECTICUT.

CONTROLLING MECHANISM.

1,061,765.  Specification of Letters Patent.  Patented May 13, 1913.

Application filed October 21, 1912. Serial No. 726,866.

*To all whom it may concern:*

Be it known that I, EMERICH J. MARKEL, a citizen of the United States, residing at New Haven, in the county of New Haven and State of Connecticut, have invented certain new and useful Improvements in Controlling Mechanism, of which the following is a specification.

This invention relates to controlling mechanism for refrigerating apparatus, the object of the invention being to provide simple, effective and inexpensive means of the character noted, by which the proper operation of a member may be effected, and this member may be the ammonia valve, the water valve or the compressor or all of said parts or in fact any other.

In the drawings accompanying and forming part of the present specification I have shown in detail two of the several forms of embodiment of the invention, which to enable those skilled in the art to practice the same will be set forth fully in the following description. I do not limit myself to this disclosure; I may depart therefrom radically and in several respects within the scope of the invention defined by the claims following said description.

Referring to said drawings: Figure 1 is a sectional view of controlling mechanism involving my invention. Fig. 2 is a detail view also in section showing a different form of thermostat for regulating the flow of the circulating liquid.

Like characters refer to like parts in both views.

Controlling mechanism involving my invention comprises a controlling member, means for circulating a liquid, the liquid governing the controlling member, and a refrigerating device, the circulating means having a thermostat in operative relation with the refrigerating device, which acts to check the flow of the liquid when the temperature of or in the refrigerating device passes below a predetermined point.

The parts just mentioned may vary greatly as to character, the invention not concerning any particular element but certain broad relations as particularly pointed out in my claims. For instance, the thermostat may constitute a part of the duct or piping through which the circulating liquid passes, and in this event the liquid is preferably congealable or is some substance which congeals at a comparatively low temperature. Or the thermostat need not necessarily form part of the piping in which case the substance need not, although it may be, congealable. The controlling member may vary considerable as to kind, a float answering satisfactorily in this connection. As will be gathered from the statements already employed, this controlling member whether it takes the form of a float, or some other part can be used in a variety of ways. In a refrigerating apparatus it preferably effects the action of the ammonia or water valves and the compressor.

I am aware that it is old in a refrigerating apparatus to control automatically the ammonia and water valves and the compressor, and that it is also old to accomplish these ends through the primary agency of a thermostat. The old organizations, however, have been complicated and therefore expensive and frequently get out of order. The thermostat in the present instance, unlike the old, is used to govern the flow a body of liquid, and this, as will be understood, can be accomplished by the congealing of the liquid when the temperature in the brine tank or equivalent, passes below a certain point or can be secured in some analogous way, for example by the operation of a valve to arrest the flow of the liquid without congealing it, said valve in turn being operated by a thermostat. In some cases my thermostat might operate on the valve electrically, but I prefer that the operation be mechanical.

Referring first to Fig. 1, the numeral 3 denotes a refrigerating or brine tank which is quite common and therefore requires no further description. The controlling mechanism will, of course, operate just as well in connection with other containers. In conjunction with the refrigerating tank 3 are the vessels or receptacles 4 and 5 arranged as shown, in superposed order, although this particular disposition is not of moment. The lower or primary vessel 4 contains a float 6 the stem 7 of which rises therein through the top of the vessel or receptacle 4 and which as illustrated has a loose connection with one arm or branch of an angle lever 8, the other branch of said angle lever being adapted to effect the action mechanically, electrically or in any of the other old ways, of the ammonia and the water valves and the compressor.

The liquid to which I have already referred is preferably in part positively circulated, and for this purpose the pump 9 driven by belt connections denoted in a general way by 10 from the compressor or refrigerating machine 11 can be advantageously employed. Connecting the vessel 4 and the pump 9 is the pipe 12, the pipe 13 leading from the discharge side of said pump 9 and opening into the upper portion of the vessel or receptacle 5. The vessels 4 and 5 are connected by the pipe 14 which extends, between the two vessels, through the refrigerating or brine tank 3, having preferably in said tank a coil or bend 15. It will be assumed that there is liquid in the vessel or receptacle 4 and that the pump 9 is in action. This liquid will therefore be drawn from the vessel 4 by the pump 9, through the pipe 12 and will be discharged by said pump into the vessel 5 by way of the pipe 13, gravitating from the vessel 5 by way of the pipe 14 into the vessel or receptacle 4. If the level of the liquid in the vessel 4 remains constant for example as shown in Fig. 1, the float 6 will be maintained in its extreme upper position, in that this level will be normally maintained by the connections described, the piping being so proportioned that the amount of liquid the pump 9 withdraws from the tank 4 and delivers into the tank 5 is supplied in equal amount from the tank 5 to the tank 4, by way of the pipe 14.

The liquid in the two vessels is preferably a substance that will congeal at comparatively low temperatures, for example five or ten degrees above zero. This is merely an example, because the liquid may be of such nature as to congeal at a far lower temperature or it might congeal at a higher temperature, the particular type of plant governing this. A solution of calcium chlorid or paraffin oil answers satisfactorily, although any other substance might be employed instead thereof. There may be cases as will hereinafter appear where the liquid need not be necessarily congealable, the essential requisite being as already intimated, the arresting of the flow of the liquid through thermostatic action, when the temperature in the refrigerating tank or equivalent device passes below a certain point.

It will be assumed that some congealable liquid such as one of those mentioned, is contained within the two vessels 4 and 5 and the piping connecting the same, and that the liquid in the coil 15 of the pipe 14 is congealed or partly solidified. In this case the pipe 14 is practically choked and so that as the pump 9 acts, the liquid will be withdrawn by said pump from the vessel 4 and be discharged into the vessel 5, and owing to the condition indicated, will not pass from the pipe 14 into the tank 4, the consequence being that the float 6 is lowered and will remain in such condition until the liquid in the coil or bend 15 liquefies, thus restoring normal circulation and causing the elevation of the float 6.

Referring now to Fig. 2, 20 denotes the refrigerating tank, 21 a pipe leading thereinto and 22 a pipe leading therefrom. The pipe 21 may extend from an upper or accumulator vessel such as that already described, while the pipe 22 may communicate directly with a lower vessel such as that also already described, in which case the two pipes will constitute part of the system for circulating the liquid which need not necessarily be congealable. While the pipes in both cases extend through the refrigerator tank, this may not always be required. The pipe 21 is open within the tank 20 to receive the valve 23 controlling the port or opening 24 at the junction of the two pipes 21 and 22, the stem of said valve being connected by the link 25 with the lever 26 mounted pivotally on the supporting member of the thermostat 27, the usual bowed spring arm of which is connected with said lever between its fulcrum and its connection with the link 25. When the temperature in the tank passes below a predetermined point, the bowed spring element of the thermostat 27 will contract to such an extent, as to effect the movement of the valve 23 through the intervening parts, across the port or opening 24 and thus arrest the flow of the liquid through the piping and hence cause the dropping of the float or some equivalent function of an analogous member. There may be cases where extreme accuracy of control is essential, and in this event the thermostat 27 or one of some other kind, in conjunction with a valve will be used for checking the circulation of the congealable liquid.

What I claim is:

1. Controlling mechanism of the class described comprising a controlling member, means for circulating a liquid, the liquid governing the controlling member, and a refrigerating device, said circulating means having a thermostat connected therewith, said thermostat being in operative relation with the refrigerating device and acting to check the flow of the liquid when the temperature in the refrigerating device passes below a predetermined point.

2. Controlling mechanism of the class described comprising a controlling member, means including piping, for circulating a liquid, the liquid governing the controlling member, and a refrigerating tank, said piping having a thermostat connected therewith, said thermostat being in operative relation with the refrigerating device and acting to check the flow of the liquid when the temperature of the refrigerating device passes below a predetermined point.

3. Controlling mechanism of the class described comprising a controlling member, means including piping, for circulating a liquid, the liquid governing the controlling member, and said piping extending through the refrigerating device and having a thermostat connected with that part thereof in the refrigerating device, said thermostat acting automatically to check the flow of the liquid when the temperature in the refrigerating device passes below a predetermined point.

4. Controlling mechanism of the class described comprising a controlling member, a system of piping, a refrigerating device through which the piping extends, the piping having a bend in the refrigerating device, a congealable liquid, and means for forcing the congealable liquid through the piping, said liquid governing the action of said controlling member.

5. The combination of a refrigerating device, a plurality of vessels, piping connecting the vessels and extending through the refrigerating device, a congealable substance, means for forcing the congealable substance from one vessel to another and then returning it to the original vessel by way of said piping, and a controlling member in one of the vessels movable by the congealable substance.

6. The combination of a refrigerating device, a vessel, a second vessel, piping connecting the first and second vessels and extending through the refrigerating device, a congealable liquid in the first vessel, means for forcibly removing said liquid from the first vessel and for supplying it into the second vessel and for also causing its return to the original source of supply, and a float in the first vessel.

In testimony whereof I affix my signature in presence of two witnesses.

EMERICH J. MARKEL.

Witnesses:
L. L. MARKEL,
F E. ANDERSON.